S. B. WARD.
Corn Planter.
No. 85,711.
Patented Jan. 5, 1869.
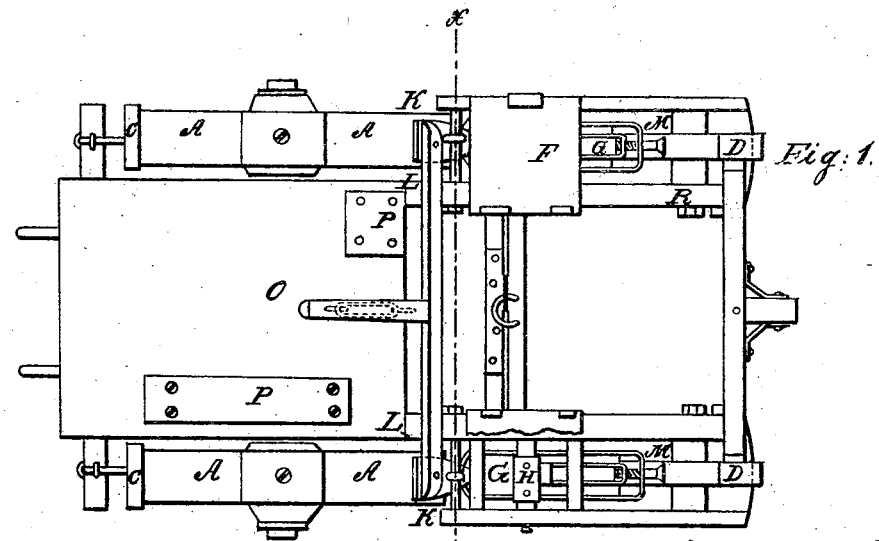
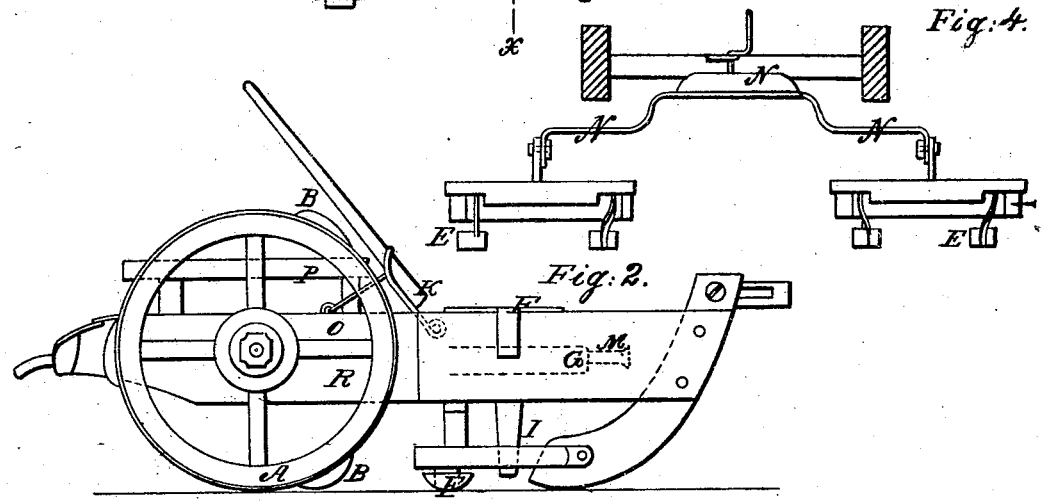
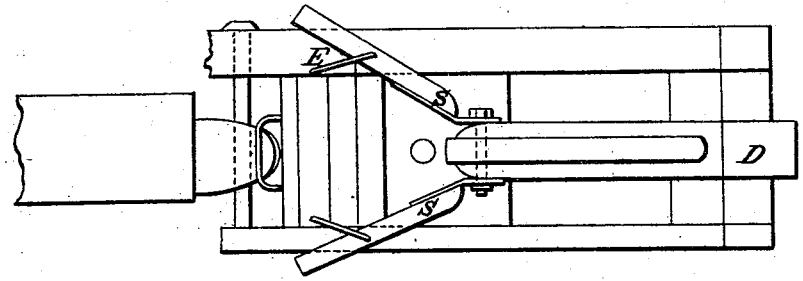
Witnesses.
C. F. Clausen
A. Ruppert
Inventor.
S. B. Ward
D. P. Holloway & Co
Attys

STEPHEN B. WARD, OF AUBURN, INDIANA.

Letters Patent No. 85,711, dated January 5, 1869.

IMPROVEMENT IN SEED-PLANTERS.

The Schedule referred to in these Letters Patent and making part of the same.

*To all whom it may concern:*

Be it known that I, STEPHEN B. WARD, of Auburn, in the county of De Kalb, and State of Indiana, have invented a new and useful Improvement in Seed-Planters; and I do hereby declare that the following is a full, clear, and exact description of the same, reference being had to the annexed drawings, making part of this specification, in which—

Figure 1 is a plan view of the machine;

Figure 2 is an elevation thereof;

Figure 3 is a bottom view; and

Figure 4 is a vertical transverse section on the line $x$-$x$ of fig. 1.

Corresponding letters refer to corresponding parts in the several figures.

The object of this invention is an improvement in seed-planters; and

It consists in the combination and arrangement of the parts thereof, as will be hereinafter described.

A A are the wheels, upon which the rear end of the machine is carried, said wheels revolving on an axle, which supports the frame.

B B are spurs or projections upon the periphery of the wheels A, for the purpose of giving motion to the dropping-slides, as will be hereafter described.

C C are scrapers, attached to the rear end of the frame by means of a spring, as shown in fig. 1, for the purpose of removing any substance which may adhere to the wheels while in use.

D D are shoes or runners, which are secured to the front end of the frame R, as shown in fig. 2, and are for the purpose of supporting the front end of such frame, and also for forming the furrow in which the seed is to be deposited.

E E are covering-shovels, attached to the frame S, and arranged to follow the tubes I, so that, as the seed is delivered from said tubes into the furrow, it is at once covered by said shovels.

F F are seed-boxes, which are arranged forward of the wheels, or between them and the rear ends of the shoes, and within or upon the frame of the machine, in such a manner that the slides in their bottoms may be worked by the projections upon the wheels in a line parallel with the line of motion of the machine.

G G are slides, which are placed within the seed-boxes, for the purpose of distributing the seeds to be planted. They may be of wood or metal, and are constructed as shown in fig. 1 of the drawings, they having an aperture through them for the passage of the seeds into the tubes I.

This aperture is controlled by means of a secondary slide, which is formed by cutting away a portion of the main slide (equal in width with the aperture through which the seed passes) from such aperture forward to the end of said main slide, and supplying its place with a small slide, which fits the space thus formed.

To the outer edges of the main slide, a yoke is attached, which extends some distance from the end of said slide, and which receives a screw, M, in its outer end, which screw is made to enter a similar yoke upon, or it may be a nut placed within, the end of the smaller or secondary slide, by which means the size of the aperture, through the main slide, is regulated, thus determining the number of seeds to be deposited in the furrow at each proper movement of said slide.

H H are blocks or bars, placed within the seed-boxes, having in their bottom or lower surfaces brushes, which are in contact with the upper surfaces of the slides, and which serve to brush back any seeds which may remain on such slide, and thus prevent their being carried over the tubes I, and scattered upon the ground.

I I are tubes or seed-conductors, secured to the bottom of the seed-boxes, in such a manner that, as the seeds are carried over said tubes by the slides G, they will be conducted to the furrow formed for their reception.

K is a cross-bar, arranged in front of the wheels, and, extending across from one to the other, has, in or near its centre, a handle attached to it, and, at its ends, it is provided with iron levers, which are pivoted to the frame of the machine by means of a bolt, which passes through a staple formed thereon, or in any other suitable manner.

L L are the levers above referred to, they being so arranged that, as the wheels revolve, the projections thereon come in contact with their upper ends, which carries them forward, while their lower ends are carried backward, thus giving motion to the slides G, to which they are connected in any suitable manner.

These levers, after having been moved as above described, are returned to their original position, to be again acted upon, by means of a spring which is attached to the handle of the cross-bar K and to the platform O of the machine, which is so arranged as to be elongated by the forward movement of the upper ends of the levers, but which contracts upon said levers being freed from contact with their moving-force.

It will be apparent that this handle and cross-bar afford the means for working the dropping-slides by hand, should that become desirable, the only change necessary to this end being the removal of the projections from the wheels, and the disconnecting of the spring and lever.

M M are the set-screws for regulating the apertures in the feed-slides.

N is the cross-bar, which is attached to the frames which carry the covering-shovels. This lever is constructed as shown in fig. 4 of the drawings, or in any other suitable manner, and has attached to it a device, suitable for raising and lowering it, and receiving it in either position, with reference to the main frame of the machine.

O is the platform of the machine.

P P are seats arranged upon the platform.

R is the frame-work of the machine.

S S are frames, attached to the rear ends of the shoes, and which carry the covering-shovels E E, as above described.

Having thus described my invention,

What I claim, and desire to secure by Letters Patent, is—

1. The combination of the wheels A, with their projections B, levers L, and seed-distributing slides G, working in concert, substantially as shown and described.

2. The arrangement of the cross-bar K, levers L, and the spring for returning said levers to their original positions, substantially as above described.

3. The construction and arrangement of the cross-bar N and frame S, which carries the covering-shovels.

4. The combination of the frame S and the shoes or furrowers D, and their arrangement with reference to the conductors I, substantially as shown and described.

In testimony whereof, I have signed my name to this specification, in the presence of two subscribing witnesses.

STEPHEN B. WARD.

Witnesses:
GEORGE KEESLAR,
GEORGE WAGGONER.